US010069564B2

United States Patent
Hening et al.

(10) Patent No.: US 10,069,564 B2
(45) Date of Patent: Sep. 4, 2018

(54) LASER-INDUCED PLASMA FILAMENTS FOR COMMUNICATION

(71) Applicant: THE UNITED STATES OF AMERICA AS REPRESENTED BY THE SECRETARY OF THE NAVY, Washington, DC (US)

(72) Inventors: Alexandru Hening, San Diego, CA (US); David T. Wayne, San Diego, CA (US); Michael G. Lovern, Chula Vista, CA (US)

(73) Assignee: THE UNITED STATES OF AMERICA AS REPRESENTED BY THE SECRETARY OF THE NAVY, Washington, DC (US)

( * ) Notice: Subject to any disclaimer, the term of this patent is extended or adjusted under 35 U.S.C. 154(b) by 31 days.

(21) Appl. No.: 15/052,722

(22) Filed: Feb. 24, 2016

(65) Prior Publication Data
US 2016/0254865 A1   Sep. 1, 2016

Related U.S. Application Data

(60) Provisional application No. 62/126,135, filed on Feb. 27, 2015.

(51) Int. Cl.
*H04B 10/00* (2013.01)
*H04B 10/112* (2013.01)
(Continued)

(52) U.S. Cl.
CPC ......... *H04B 10/1123* (2013.01); *G02B 27/10* (2013.01); *H04B 10/80* (2013.01); *G02F 1/3511* (2013.01)

(58) Field of Classification Search
CPC ........ G02B 27/10; G02B 21/01; G02B 21/18; G02F 1/3511; G02F 2001/3528; H04B 10/1123; H04B 10/80; H04B 10/50; H04B 41/38; H04B 13/00; H05H 1/0012; H05H 2001/486; H05H 1/46; H01L 21/268;
(Continued)

(56) References Cited

U.S. PATENT DOCUMENTS 6,483,077 B1 * 11/2002 Albright .............. B23K 9/0675
  219/130.4
7,391,557 B1 *  6/2008 Bruch ...................... G01J 3/10
  356/450
(Continued)

OTHER PUBLICATIONS

Jhajj, N. et al., "Demonstration of Long-Lived High-Power Optical Waveguides in Air", Physical Review X, American Physical Society, vol. 4, pp. 1-8, Feb. 2014.
(Continued)

*Primary Examiner* — Hibret Woldekidan
(74) *Attorney, Agent, or Firm* — Spawar Systems Center Pacific; Kyle Eppele; Ryan Friedl

(57) ABSTRACT

A system and method involve using a first laser to generate a laser-induced plasma filament within an optically-transparent medium, using a second laser to generate a communication signal, and using a signal combiner positioned within the path of both the first laser and the second laser to direct the communication signal through the laser-induced plasma filament to a receiver located within the optically-transparent medium.

6 Claims, 4 Drawing Sheets

(51) Int. Cl.
*G02B 27/10* (2006.01)
*H04B 10/80* (2013.01)
*G02F 1/35* (2006.01)

(58) Field of Classification Search
CPC .... G01J 11/00; G01J 3/10; G01N 2021/1793; G01N 21/636; G01N 2201/0697
USPC .......... 398/140, 157, 104, 118, 130
See application file for complete search history.

(56) References Cited

U.S. PATENT DOCUMENTS

| | | | | |
|---|---|---|---|---|
| 7,453,552 | B1* | 11/2008 | Miesak | G01S 7/4814 356/4.01 |
| 7,729,044 | B2* | 6/2010 | Theberge | G02F 1/3511 359/326 |
| 7,732,351 | B2* | 6/2010 | Oishi | B23K 26/0613 438/710 |
| 7,903,698 | B1* | 3/2011 | Lundquist | G02F 1/3511 372/109 |
| 8,319,435 | B1* | 11/2012 | Wood | H05H 1/48 315/111.21 |
| 8,665,923 | B2* | 3/2014 | Sprangle | H01S 3/2237 372/5 |
| 8,772,128 | B2* | 7/2014 | Yamazaki | B23K 26/03 438/458 |
| 8,772,974 | B2 | 7/2014 | Lane | |
| 9,268,194 | B2* | 2/2016 | Kremeyer | G02F 1/3511 |
| 9,484,702 | B2* | 11/2016 | Payeur | H01S 3/0057 |
| 9,544,065 | B2* | 1/2017 | Segev | H04B 10/80 |
| 9,575,309 | B2* | 2/2017 | Theberge | G02B 23/06 |
| 9,897,548 | B2* | 2/2018 | Hening | G01N 21/718 |
| 2011/0003461 | A1* | 1/2011 | Yamazaki | H01L 21/268 438/458 |
| 2012/0114007 | A1* | 5/2012 | Jones | G02F 1/3511 372/51 |
| 2012/0170599 | A1* | 7/2012 | Sprangle | H01S 3/2237 372/5 |
| 2013/0148685 | A1* | 6/2013 | Jones | H01S 1/04 372/51 |
| 2014/0056028 | A1* | 2/2014 | Nichol | G02B 6/0028 362/611 |
| 2015/0003104 | A1* | 1/2015 | Huang | G02B 6/005 362/606 |
| 2016/0097616 | A1* | 4/2016 | Weigold | F41H 13/0062 250/396 R |
| 2016/0266466 | A1* | 9/2016 | Milchberg | G02F 1/3511 |

OTHER PUBLICATIONS

Couairon, A, et al., "Viewpoint: A Waveguide Made of Hot Air", Physics, American Physical Society, vol. 7, No. 21, Feb. 2014.
Helle, M.H., et al., "Formation and Propagation of Meter-Scale Laser Filaments in Water", Applied Physics Letters, vol. 103, 121101, 2013.
Turcu, I.C.E, et al., "Spatial Coherence Measurements and X-Ray Holographic Imaging Using a Laser-Generated Plasma X-Ray Source in the Water Window Spectral Region", J. Appl. Phys., vol. 73, 8081, 1993.
Apostol, I. et al., "Laser Produced Cadmium Plasma as a Laser Source", Proc. SPIE 1033, Trends in Quantum Electronics, vol. 2, May 1989.
Ursu, I., et al., "Threshold conditions for the air plasma initiation near solid surfaces under the action of powerful pulsed $CO_2$ laser radiation", J. of Appl. Phys., vol. 58, pp. 1765-1771, 1985.
Couairon, A., "Filamentation length of powerful laser pulses", Appl. Phys. B, vol. 76, pp. 789-792, 2003.
Hammer, Daniel X., "Experimental investigations of ultrashort pulse-laser unduced breakdown thresholds in aqueous media", IEEE Journal of Quantum Electronics, vol. 32, No. 4, pp. 670-678, Apr. 1996.
Braun, A., et al., "Self channeling of high peak power femtosecond laser pulses in air", Optics Letters, vol. 20, No. 1, pp. 73-75, 1995.
Ackermann, R., "Laser filaments generated and transmitted in highly turbulent air", Optics Letters, vol. 31, No. 1, pp. 86-89, 2006.

* cited by examiner

LASER-INDUCED PLASMA FILAMENTS FOR COMMUNICATION

CROSS-REFERENCE TO RELATED APPLICATIONS

This application claims the benefit of U.S. Provisional Patent Application Ser. No. 62/126,135 filed Feb. 27, 2015, entitled "Laser-Induced Filaments for Underwater Optical Communication Links", the content of which is fully incorporated by reference herein.

FEDERALLY SPONSORED RESEARCH AND DEVELOPMENT

This invention is assigned to the United States Government. Licensing inquiries may be directed to Office of Research and Technical Applications, Space and Naval Warfare Systems Center, Pacific, Code 72120, San Diego, Calif., 92152; telephone (619) 553-5118; email: ssc_pac_t2@navy.mil. Reference Navy Case No. 103014.

BACKGROUND OF THE INVENTION

Free-space laser communications systems experience performance degradation in certain scenarios, such as when heavy fog or smoke obscures the line of sight. A need exists for an improved system and method for laser communications in free space and other environments when encountering adverse, high-loss, and/or denied conditions.

DETAILED DESCRIPTION OF SOME EMBODIMENTS

Reference in the specification to "one embodiment" or to "an embodiment" means that a particular element, feature, structure, or characteristic described in connection with the embodiments is included in at least one embodiment. The appearances of the phrases "in one embodiment", "in some embodiments", and "in other embodiments" in various places in the specification are not necessarily all referring to the same embodiment or the same set of embodiments.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of the "a" or "an" are employed to describe elements and components of the embodiments herein. This is done merely for convenience and to give a general sense of the invention. This detailed description should be read to include one or at least one and the singular also includes the plural unless it is obviously meant otherwise.

A laser beam propagating through the atmosphere is affected by absorption and scattering of radiation from fog, clouds, rain, snow, smoke, dust, etc. Atmospheric attenuation is typically dominated by fog and clouds and is, therefore, the primary focus of the research proposed here. In the particular case of "free-space optical links", the amount of light transmitted through fog and clouds will affect the link, first degrading the bit error rate and then at some higher attenuation level the laser communication system will cease to operate. The system proposed here could be used under those adverse conditions, and other adverse conditions specific to other operating environments, to improve and/or to restore a compromised communication link.

Figure 1:
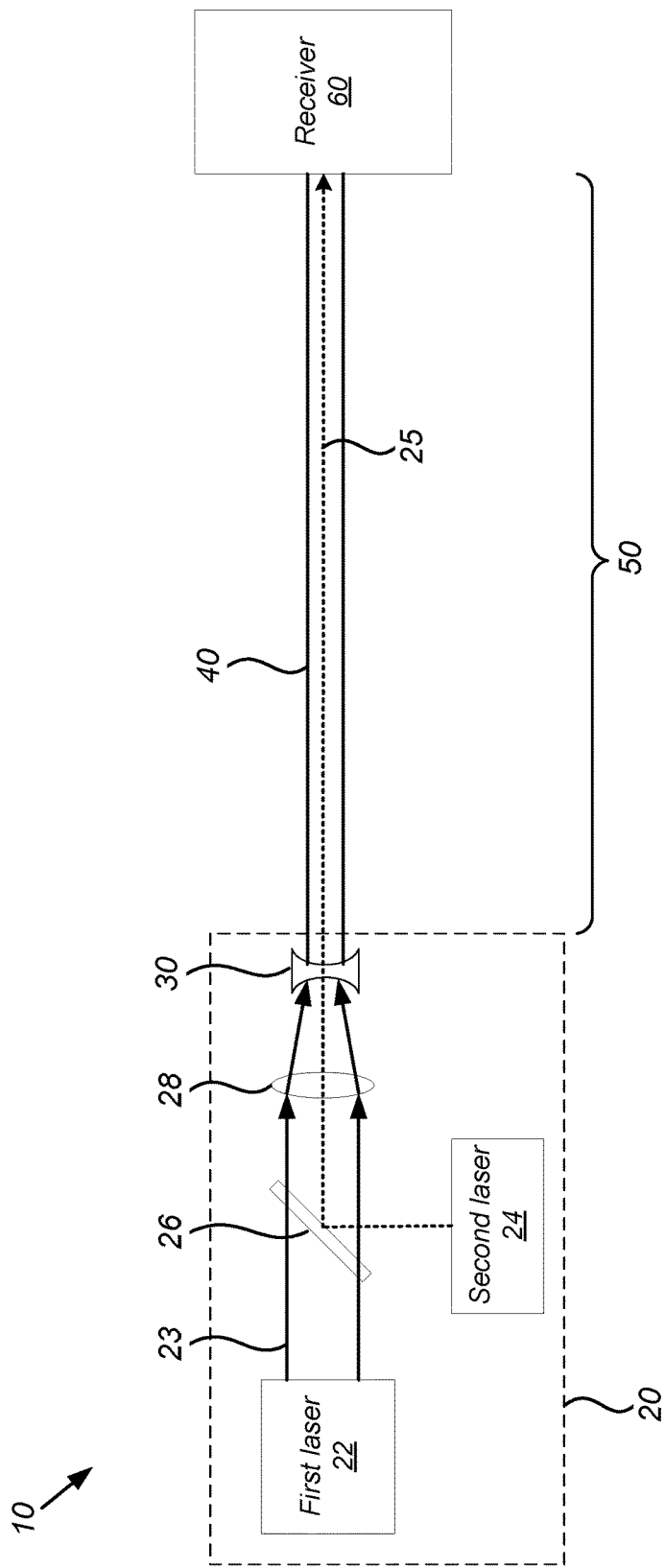
FIG. 1 shows a block diagram of an embodiment of a system in accordance with the Laser-Induced Plasma Filaments for Communication.

FIG. 1 shows a block diagram of an embodiment of a system 10 in accordance with the Laser-Induced Filaments for Communication. System 10 includes a transmitter 20 separated by a receiver 60 by an optically-transparent medium 50. As an example, optically-transparent medium 50 may be a liquid or a gas. Transmitter system 20 includes a first laser 22, second laser 24, signal combiner 26, focusing lens 28, and collimating lens 30.

First laser 23 is configured to generate a laser-induced plasma filament 40 within optically-transparent medium 50. In some embodiments, first laser 22 is configured to generate the laser-induced plasma filament using a plurality of high-power, ultra-short pulses. As an example, first laser 22 is an excimer laser. In some embodiments, first laser 22 may be configured with the following characteristics: KrF, $\lambda=248$ nm, $E=400$ mJ, pulse duration of $t=20$ ns, and $P\sim20$ MW. In some embodiments, first laser 22 may be configured with the following characteristics: KrF, $\lambda=308$ nm, $E=1.0$ J, pulse duration of $t=20$ ns, and $P\sim50$ MW.

Second laser 24 is configured to generate a communication signal 25 for transmission to receiver 60. In some embodiments, communication signal 25 is an optical signal and receiver 60 is an optical receiver. In some embodiments, communication signal 25 is an electromagnetic signal and receiver 60 is an electromagnetic receiver. Receiver 60 is separated from first laser 22 and second laser 24 by optically-transparent medium 50 and is configured to receive communication signal 25. Signal combiner 26 is positioned within the path of both first laser 22 and second laser 24 such that communication signal 25 is directed by signal combiner 26 through laser-induced plasma filament 40 to receiver 60.

System 10 offers benefits such as an increase in the bit rate and an extension of the communication range of a link. Further, system 10 is not affected by changes and/or fluctuations in any of the optically-transparent medium parameters, such as flow, turbulence, particulates, dopants, etc.

Figure 2:
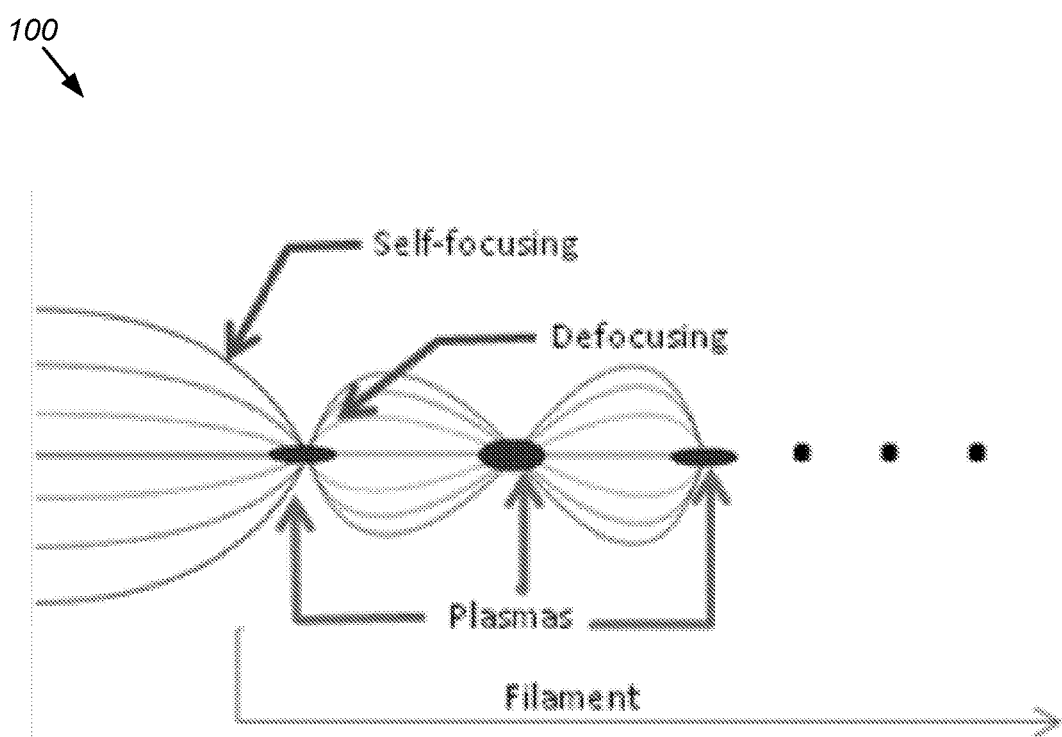
FIG. 2 shows a diagram illustrating the formation and evolution of a laser-induced plasma filament.

FIG. 2 shows a diagram 100 illustrating the formation and evolution of a laser-induced plasma filament. Laser-beam propagation through optically transparent media is influenced by many parameters such as, the laser pulse energy, the temporal and spatial beam profile, the wavelength, the repetition rate, and the physical properties of the propagating media. Two competing physical processes are involved: self-focusing due to optical Kerr effect and optical diffraction. The index of refraction of an optically transparent media is affected by the presence of an intense electromagnetic field associated with the laser beam; the process is highly localized and has an almost instantaneous response time.

The net result is a "lens like" effect and the laser beam will be focused because the wave front is changing the index of refraction of its propagating media. The generated laser-induced plasma will increase the dispersion of the laser beam as the high density of electrons and ions in the plasma leads to a diverging (defocused) laser beam. The process will be re-initiated and the overall effect it is an array of focusing-defocusing cycles (as shown in FIG. 2), what is called a "filament". The plasma channel that is created, which is actually a long filament that can extend a few hundreds of meters, can be used as a low-loss propagating media for a second laser beam, in this case the "communication laser".

Point-to-point free-space laser communication is directly affected by the transmission of laser beams through fog and clouds. The "atmospheric channel" is subjected to many physical processes like scattering (Rayleigh, Mie), absorption, scintillation, dispersion, and turbulence, which all contribute to the degradation of the communication link. An attractive way of overcoming all those usual atmospheric optical limitations is to use laser-induced filaments as a conduit for the communication beam.

It has been shown that self-focusing occurs when the laser power exceeds a critical threshold ($P_{cr}$, critical power); beyond that value, the intensity-dependent refractive index enables the pulse to overcome the natural diffraction spreading and begin to self-focus. The self-focusing effect is the crucial element in filament formation. It is a third-order non-linear optical process known as the optical Kerr Effect and is due to the intensity-dependent index of refraction. The critical power for a Gaussian beam is calculated as $$P_{cr} = \frac{3.37\lambda^2}{8\pi n_0 n_2}, \qquad \text{(Eq. 1)}$$

where $n_0$ is the linear refractive index, $n_2$ is the non-linear refractive index, and is the wavelength of the laser source, such as first laser 22. Typical values for $n_2$ are $n_2=5.0\times10^{-19}$ cm$^2$/W for air and $n_2=4.1\times10^{-16}$ cm$^2$/W for water. For reference, in vacuum, $n_2=1.0\times10^{-34}$ cm$^2$/W. Above the critical power, filaments begin to develop and could propagate for distances varying from a few centimeters to a few kilometers.

Some values for critical power in air $P_{cr}=3$ GW at $\lambda=800$ nm and $P_{cr}=270$ MW at $\lambda=248$ nm. For water, the critical power has values in the range of MW or less. Experiments have been performed in a high-loss atmosphere, allowing for simulation of adverse propagation conditions for the free-space optical communication link as well as reduction of the critical power.

Another element in laser-induced plasma filament propagation is the distance from the laser that the filament is initiated. A semi-empirical formula for the distance $z_c$ that an initially collimated Gaussian beam of waist $w_0$ and wavenumber $k_0=2\pi/\lambda_0$ will collapse if its power is larger than $P_{cr}$:

$$z_c=0.184(w_0)^2 k_0/\{[(P/P_{cr})^{1/2}-0.853]^2-0.0219\}^{-1/2}, \qquad \text{(Eq. 2)}$$

or $$z_c=0.367\pi n_0(w_0)^2\{[(P/P_{cr})^{1/2}-0.853]^2-0.0219\}^{-1/2}, \qquad \text{(Eq. 3)}$$

This expression provides a good estimation of the onset of filamentation for a Gaussian beam in the single-filament regime and gives flexibility to adjust the position of the laser-induced plasma filament. To achieve the self-guided propagation of a collimated beam, which defines the filamentation regime, a dynamical balance between the focusing and the defocusing effects must be established.

The filamentation regime possible from the propagation of high-power, ultra-short laser pulses in air is very attractive for atmospheric applications because it allows for conveying high optical intensities at long distances. Further, a precise control of the onset of filamentation can be achieved through simple strategies. It is possible to generate a filament at the desired location even at distances from the laser source of the order of hundreds of meters or even a few kilometers.

During such long-range propagation, air turbulence must be considered as a potential source of increased losses and beam instability, that filamentation exhibits remarkable robustness against typical atmospheric perturbations of the refractive index. One of the key advantages of filaments in the context of atmospheric applications is their pronounced resistance to adverse conditions, particularly to air turbulence, that induces refracting index gradients. It has been shown that filaments can propagate through localized strongly turbulent regions up to five orders of magnitude above typical atmospheric conditions. They are thus almost unaffected by the perturbations they have encountered. This suggests that refractive-index gradients are not the limiting factors for atmospheric propagation of filaments.

If the refractive-index gradients induced by both turbulence (optical losses), $$\nabla n_r \sim 9.1\times10^{-5}\times(T_s/T\times\Delta r), \qquad \text{(Eq. 4)}$$

and the one generated by the process of filamentation, $$\nabla n_{fil} \sim n_2 I/d, \qquad \text{(Eq. 5)}$$

where $I=10^{14}$ W/cm$^2$ is the typical intensity within the filament, d~100 μm is the diameter of the filament, and $T_s=293$ K is the standard room temperature.

Experiments show a value of about 0.3 m$^{-1}$ for $\nabla n_{fil}$. In comparison, $\nabla n_r \sim 10^{-3}$ m$^{-1}$ for T=373 K and $\Delta r=10^{-2}$ m. That is, a much smaller value for turbulence than for filamentation. This shows that the changes of the refractive index induced by the propagation of the filament are much larger than the ones generated by local turbulences. Hence, this is one of the reasons the filament is able to propagate through clouds, fog, etc., almost unperturbed.

Figure 3:
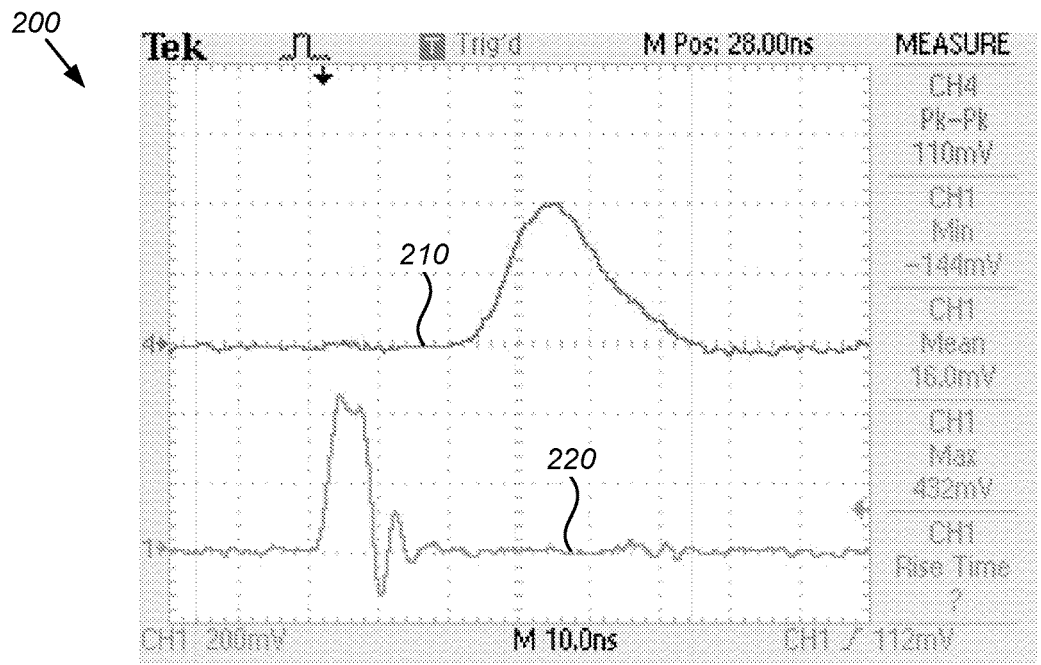
FIG. 3 shows a graph illustrating laser pulse propagation through a high-loss optical medium without the use of a laser-induced plasma filament.
Figure 4:
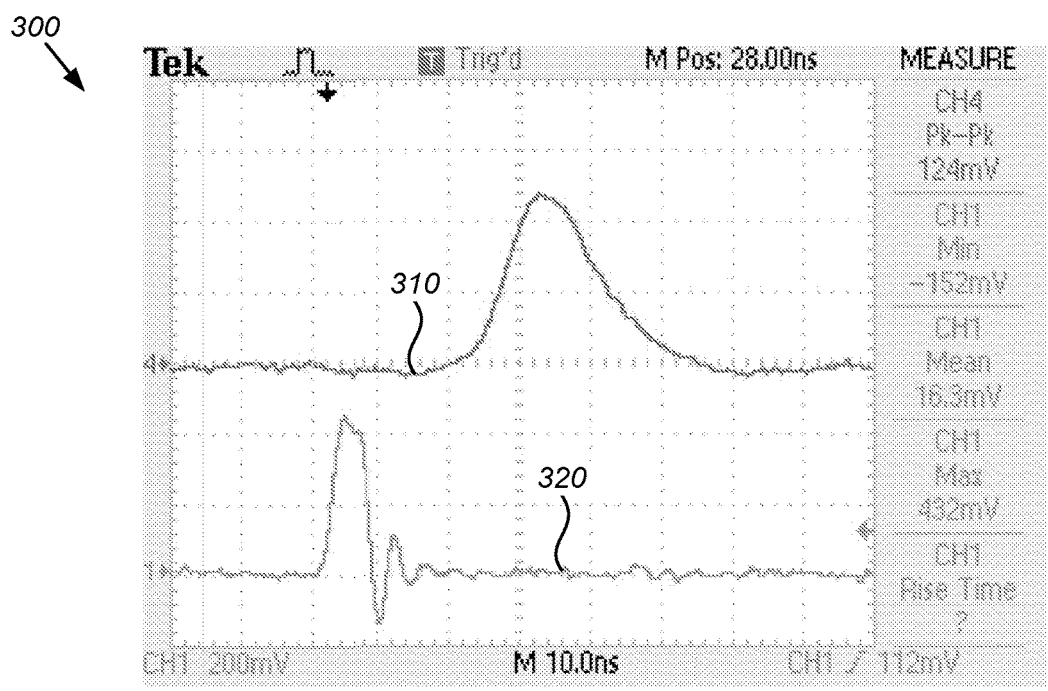
FIG. 4 shows a graph illustrating laser pulse propagation through a high-loss optical medium with the assistance of a laser-induced plasma filament.

System 10 shown in FIG. 1 was operated through a high-loss optical medium with and without the laser-induced plasma filaments. In the experiments, the high-loss optical medium was a glass cell with fused silica windows, with the length of the cell being $50\times10^{-2}$ m and the length of the filament being about $5\times10^{-2}$ m. Referring to FIGS. 3 and 4, FIG. 3 shows a graph 200 illustrating laser pulse propagation through the experimental high-loss optical medium without the use of a laser-induced plasma filament and FIG. 4 shows a graph 300 illustrating laser pulse propagation with the assistance of a laser-induced plasma filament.

In FIG. 3, line 210 represents the amplitude of the signal transmitted through optically absorbing media, without the presence and contribution of the laser induced plasma filament, while line 220 represents the reference signal. In FIG. 4, line 310 represents the amplitude of the signal transmitted through optically absorbing media, with the contribution of and in the presence of the laser-induced plasma filament. Line 320 represents the reference signal, which is the same as the reference signal 220 shown in FIG. 3. Line 310 in FIG. 4 represents about a 5% increase in the detected pulse amplitude, as compared to line 210, resulting from the use of the laser-induced plasma filament.

In some embodiments, the laser-induced plasma filament length is one-tenth of the total optical path length (emitter to receiver). In an ideal case, where there is no attenuation through the laser-induced plasma filament, an increase of the received signal (line 310, FIG. 3) of about 12% may be seen. The measurements demonstrate that a laser-induced plasma filament was generated having the right density that allows for the communication laser beam to propagate through optically absorbing media.

While the experiments were performed in a gaseous medium, the embodiments may be performed in other optically absorbing media such as such as air, fog, clouds, water, etc., including an underwater environment, or may be performed using air-to-water interface optical links. Further, although first laser 22 was configured with a pulse duration in the nanosecond regime, in some embodiments first laser 22 may be configured with an ultra-short pulse duration in the femtosecond regime.

Figure 5:
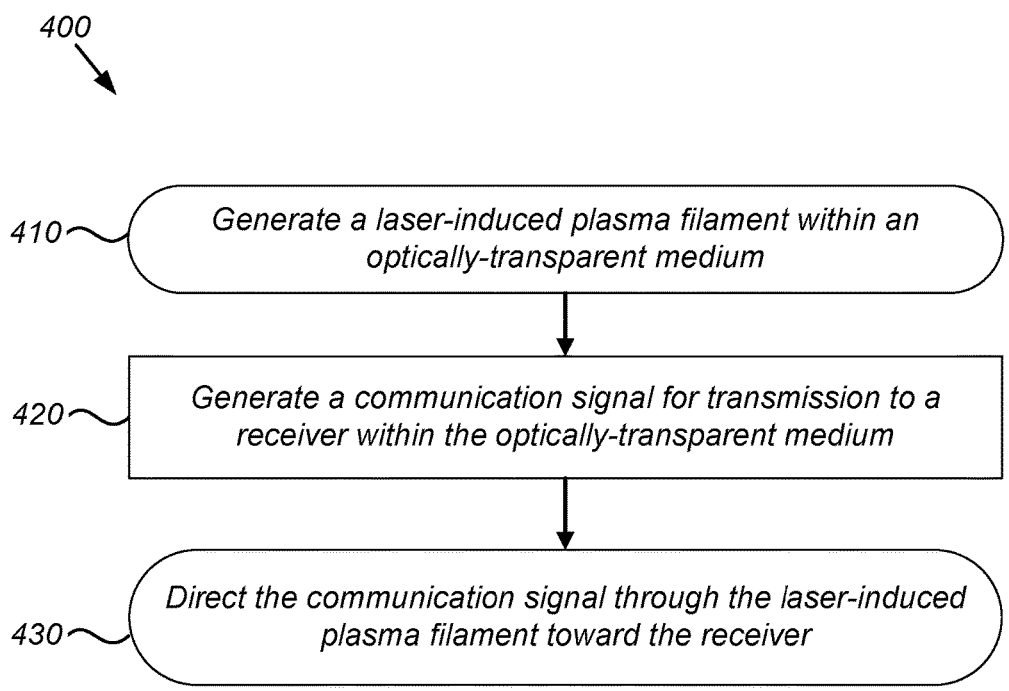
FIG. 5 shows a flowchart of an embodiment of a method in accordance with the Laser-Induced Plasma Filaments for Communication.

FIG. 5 shows a flowchart of an embodiment of a method in accordance with the Laser-Induced Filaments for Communication. As an example, method 400 may be performed by system 10 as shown in FIG. 1 and will be discussed with reference thereto. Also, while FIG. 5 shows one embodiment of method 400 to include steps 410-430, other embodiments of method 400 may contain fewer or more steps. Further, while in some embodiments the steps of method 400 may be performed as shown in FIG. 5, in other embodiments the steps may be performed in a different order, or certain steps may occur simultaneously with one or more other steps.

Method 400 may begin with step 410, which involves using a first laser 22 to generate a laser-induced plasma filament 40 within an optically-transparent medium 50. Method 400 may then proceed to step 420, which involves using a second laser 24 to generate a communication signal 25 for transmission to a receiver 60 within optically-transparent medium 50. Method 400 may then proceed to step 430, which involves using a signal combiner 26 positioned within the path of both first laser 22 and second laser 24 to direct communication signal 25 through laser-induced plasma filament 40 to receiver 60.

Many modifications and variations of the embodiments disclosed herein are possible in light of the above description. Within the scope of the appended claims, the disclosed embodiments may be practiced otherwise than as specifically described. Further, the scope of the claims is not limited to the implementations and embodiments disclosed herein, but extends to other implementations and embodiments as may be contemplated by those having ordinary skill in the art.

We claim:

1. A method comprising the steps of:
using a first laser to generate a laser-induced plasma filament within an optically-transparent medium, wherein the first laser is a Kypton fluoride laser configured with a wavelength of 248 nm, an energy of 400 mJ, a pulse duration of 20 ns, and a power of about 20 MW;
using a second laser to generate an optical communication signal; and
using a signal combiner positioned within the path of both the first laser and the second laser to direct the optical communication signal through the laser-induced plasma filament to an optical receiver located within the optically-transparent medium.

2. The method of claim 1, wherein the optically-transparent medium is a liquid.

3. The method of claim 1, wherein the optically-transparent medium is a gas.

4. A method comprising the steps of:
using a first laser to generate a laser-induced plasma filament within an optically-transparent medium, wherein the first laser is a Kypton fluoride laser configured with a wavelength of 308 nm, an energy of 1.0 J, a pulse duration of 20 ns, and a power of about 50 MW;
using a second laser to generate an optical communication signal; and
using a signal combiner positioned within the path of both the first laser and the second laser to direct the optical communication signal through the laser-induced plasma filament to an optical receiver located within the optically-transparent medium.

5. The method of claim 4, wherein the optically-transparent medium is one of a liquid and a gas.

6. A system comprising:
a first laser configured to generate a laser-induced plasma filament within an optically-transparent medium, wherein the optically-transparent medium is a liquid, wherein the first laser is a Kypton fluoride laser configured with a wavelength of 248 nm, an energy of 400 mJ, a pulse duration of 20 ns, and a power of about 20 MW;
a second laser configured to generate an optical communication signal;
an optical receiver separated from the first laser and the second laser by the optically-transparent medium, wherein the optical receiver is configured to receive the optical communication signal; and
a signal combiner positioned within the path of both the first laser and the second laser such that the optical communication signal is directed by the signal combiner through the laser-induced plasma filament to the optical receiver.

* * * * *